(12) United States Patent
Ehara et al.

(10) Patent No.: US 8,075,665 B2
(45) Date of Patent: Dec. 13, 2011

(54) REDUCTION TREATMENT APPARATUS AND METHOD OF REDUCTION TREATMENT

(75) Inventors: Nobuo Ehara, Tokyo (JP); Isshu Tetsuyama, Tokyo (JP); Shigeki Kashio, Osaka (JP); Yuzuru Satou, Uto (JP)

(73) Assignee: Sumitomo Heavy Industries, Inc., Tokyo (JP)

( * ) Notice: Subject to any disclaimer, the term of this patent is extended or adjusted under 35 U.S.C. 154(b) by 11 days.

(21) Appl. No.: 12/630,019

(22) Filed: Dec. 3, 2009

(65) Prior Publication Data

US 2010/0139456 A1    Jun. 10, 2010

Related U.S. Application Data

(63) Continuation of application No. PCT/JP2008/059465, filed on May 22, 2008.

(30) Foreign Application Priority Data

Jun. 4, 2007   (JP) ............................... P2007-148492

(51) Int. Cl.
*C21B 11/06*      (2006.01)
(52) U.S. Cl. ............... 75/477; 75/622; 266/44; 266/173
(58) Field of Classification Search ................... 75/477, 75/622; 266/173, 44
See application file for complete search history.

(56) References Cited

U.S. PATENT DOCUMENTS

| 4,304,597 | A | * | 12/1981 | Keran et al. ..................... 75/380 |
| 4,443,250 | A | * | 4/1984 | Meyer et al. .................... 75/444 |
| 4,581,061 | A | * | 4/1986 | Ulrich et al. .................... 75/477 |
| 7,438,730 | B2 | * | 10/2008 | Igawa et al. ..................... 23/314 |

FOREIGN PATENT DOCUMENTS

| JP | 11-1725 | 1/1999 |
| JP | 2002-241850 | 8/2002 |
| JP | 2005-029836 | 2/2005 |
| JP | 2006-328451 | 12/2006 |
| JP | 2006328451 A | * 12/2006 |

OTHER PUBLICATIONS

Machine translation of JP 2006-328451 published Dec. 2006.*
International Preliminary Report on Patentability for international application No. PCT/JP2008/059465 filed May 22, 2008 issued on Dec. 17, 2009.

* cited by examiner

*Primary Examiner* — George Wyszomierski
*Assistant Examiner* — Tima M McGuthry Banks
(74) *Attorney, Agent, or Firm* — Squire, Sanders & Dempsey (US) LLP

(57) ABSTRACT

A reduction treatment apparatus can include a reduction furnace configured to reduce zinc and/or iron oxide through heat treatment of zinc-containing iron oxide or zinc oxide or iron oxide, with a reducing material. The reduction treatment apparatus also has an oxide inlet configured to supply to the reduction furnace the zinc-containing iron oxide or zinc oxide or iron oxide. The reduction treatment apparatus further has a reducing material inlet configured to supply to the reduction furnace the reducing material. The reducing material can comprise at least one of ASR, shredder dust of home electric appliances, waste plastics, refuse derived fuel, refuse paper and plastic fuel, sludge, oil mud, chips of wood, thread debris, rubber debris, and animal and plant residues. The reduction furnace can be configured to use the reducing material as a heating material and reduce the zinc-containing iron oxide or zinc oxide or iron oxide without auxiliary fuel.

5 Claims, 4 Drawing Sheets

REDUCTION TREATMENT APPARATUS AND METHOD OF REDUCTION TREATMENT

RELATED APPLICATION

This is a continuation application of International Patent Application No. PCT/JP2008/059465, filed on May 22, 2008, which claims priority to Japanese Patent Application No. 2007-148492, filed Jun. 4, 2007. The subject matter of these earlier filed applications are hereby incorporated by reference.

FIELD

The present invention relates to a reduction treatment apparatus for reducing zinc-containing iron oxide or zinc oxide or iron oxide, and to a method of reduction treatment.

RELATED ART

There are known methods of dezincification from zinc-containing iron oxide using rotary kiln (For example, refer to Japanese Published Unexamined Patent Application NO. 2002-241850). For example, the material to be treated is a dust containing zinc-containing iron oxide generated from ironworks, and the dezincification is performed by the steps of producing a mixed raw material composed mainly of the material to be treated and a carbon material (reducing material) such as coke for reducing zinc oxide and iron oxide in the zinc-containing iron oxide, charging the mixed raw material to the furnace of rotary kiln having 1100° C. or higher internal atmosphere, heating the charged mixed raw material by a heavy oil-oxygen burner (fuel combustion unit), thus reducing the zinc oxide in the zinc-containing iron oxide by the carbon material, further vaporizing the reduced zinc oxide, and thus obtaining an iron-containing material capable of being charged to a reduction furnace such as blast furnace.

SUMMARY

A reduction treatment apparatus according to certain embodiments of the present invention includes a reduction furnace configured to reduce zinc and/or iron oxide thorough heat treatment of zinc-containing iron oxide or zinc oxide or iron oxide, with a reducing material. The reduction treatment apparatus also has an oxide inlet configured to supply to the reduction furnace the zinc-containing iron oxide or zinc oxide or iron oxide. The reduction treatment apparatus further has a reducing material inlet configured to supply to the reduction furnace the reducing material. The reducing material comprises at least one of ASR, shredder dust of home electric appliances, waste plastics, PDF, RPF, sludge, oil mud, chips of wood, thread debris, rubber debris, and animal and plant residues. The reduction furnace can be configured to use the reducing material as a heating material and reduce the zinc-containing iron oxide or zinc oxide or iron oxide without auxiliary fuel.

A reduction treatment apparatus according to certain embodiments of the present invention includes reducing means for reducing zinc and/or iron oxide thorough heat treatment of zinc-containing iron oxide or zinc oxide or iron oxide, with a reduction material. The reduction treatment apparatus also has oxide supplying means for supplying to the reducing means the zinc-containing iron oxide or zinc oxide or iron oxide. The reduction treatment apparatus further has reduction material supplying means for supplying to the reducing means the reduction material. The reducing material comprises at least one of ASR, shredder dust of home electric appliances, waste plastics, PDF, RPF, sludge, oil mud, chips of wood, thread debris, rubber debris, and animal and plant residues. The reducing means is configured to use the reducing material as a heating material and reduce the zinc-containing iron oxide or zinc-oxide or iron oxide without auxiliary fuel.

Certain embodiments of the present invention relate to a method of reduction treatment for obtaining metallic iron by reducing zinc and/or iron oxide thorough heat treatment of zinc-containing iron oxide or zinc oxide or iron oxide with a reducing material in a reduction furnace. The method can include supplying at least one of ASR, shredder dust of home electric appliances, waste plastics, PDF, RPF, sludge, oil mud, chips of wood, thread debris, rubber debris, and animal and plant residues to the reduction furnace as the reducing material and as a heating material. The method can also include performing the reduction treatment with the use of the material as the heat source and without using auxiliary fuel.

DETAILED DESCRIPTION

Figure 1:
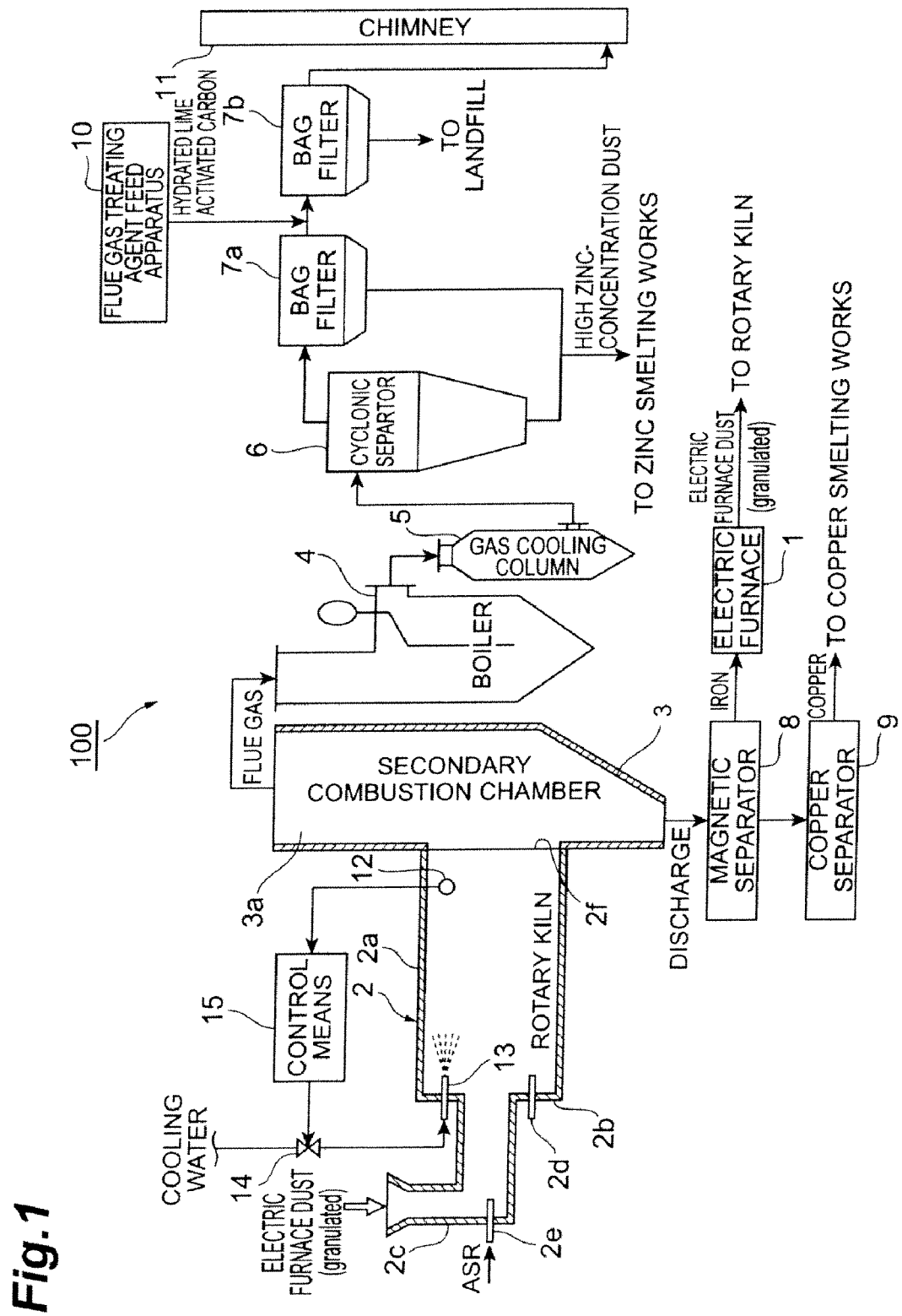
FIG. 1 illustrates the facilities provided with the reduction treatment apparatus according to an embodiment of the present invention.

The technology of Japanese Published Unexamined Patent Application NO. 2002-241850 is required to decrease the treatment cost. There is wanted the decrease in treatment cost also in the case where the target of reduction treatment is switched from zinc-containing iron oxide to zinc oxide or iron oxide.

Certain embodiments of the present invention have been perfected to solve the above problem, and can provide a reduction treatment apparatus and a method of reduction treatment considered to be able to decrease the treatment cost in the case of obtaining metallic iron by applying heat treatment to zinc-containing iron oxide or zinc oxide or iron oxide together with a reducing material, to thereby reduce zinc and/or iron oxide.

A reduction treatment apparatus according to certain embodiments of the present invention can include a reduction furnace configured to reduce zinc and/or iron oxide thorough heat treatment of zinc-containing iron oxide or zinc oxide or iron oxide, with a reducing material. The reduction treatment apparatus can also have an oxide inlet configured to supply to the reduction furnace the zinc-containing iron oxide or zinc oxide or iron oxide. The reduction treatment apparatus can further have a reducing material inlet configured to supply to the reduction furnace the reducing material. The reducing material comprises at least one of ASR, shredder dust of home electric appliances, waste plastics, PDF, RPF, sludge, oil mud, chips of wood, thread debris, rubber debris, and animal and plant residues. The reduction furnace can be configured to use the reducing material as a heating material and reduce the zinc-containing iron oxide or zinc-oxide or iron oxide without auxiliary fuel.

A reduction treatment apparatus according to certain embodiments of the present invention can include reducing means for reducing zinc and/or iron oxide thorough heat treatment of zinc-containing iron oxide or zinc oxide or iron oxide, with a reduction material. The reduction treatment apparatus can also have oxide supplying means for supplying to the reducing means the zinc-containing iron oxide or zinc oxide or iron oxide. The reduction treatment apparatus can further have reduction material supplying means for supplying to the reducing means the reduction material. The reducing material can comprise at least one of ASR, shredder dust of home electric appliances, waste plastics, PDF, RPF, sludge, oil mud, chips of wood, thread debris, rubber debris, and animal and plant residues. The reducing means can be configured to use the reducing material as a heating material and reduce the zinc-containing iron oxide or zinc-oxide or iron oxide without auxiliary fuel.

Certain embodiments of the present invention relate to a method of reduction treatment for obtaining metallic iron by reducing zinc and/or iron oxide thorough heat treatment of zinc-containing iron oxide or zinc oxide or iron oxide with a reducing material in a reduction furnace. The method can include supplying at least one of ASR, shredder duet of home electric appliance; waste plastics, PDF, RPF, sludge, oil mud, chips of wood, thread debris, rubber debris, and animal and plant residues to the reduction furnace as the reducing material and as a heating material. The method can also include performing the reduction treatment with the use of the material as the heat source and without using auxiliary fuel.

According to the above-described reduction apparatus and method of reduction treatment, to the reduction furnace to which zinc-containing iron oxide or zinc oxide or iron oxide is fed, there is supplied at least one of ASR, shredder dust of home electric appliances, waste plastics, refuse-derived RDF (Refuse Derived Fuel), RPF (Refuse Paper and Plastic Fuel), sludge, oil mud, chips of wood, thread debris, rubber debris, and animal and plant residues, which are the waste effective as a reducing material and function as a heating material generating heat necessary for reduction, and the reduction treatment is performed by utilizing the material as the heat source without using auxiliary fuel. As a result, metallic iron is obtained through the reduction of zinc and/or iron oxide while the reduction of the treatment cost (reduction of the running cost by not using auxiliary fuel) is performed.

There are many kinds of applicable reduction furnace. The reduction furnace can be a rotary kiln. A rotary kiln readily accepts even an ASR in a state of being discharged from shredder dust trader, and because the rotary kiln can create an adequate reducing atmosphere inside the furnace.

When a material containing Ca may be fed to the reduction furnace, the basicity in the reduction furnace increases, and thus the formation of clinker in the reduction furnace can be prevented.

In addition, when zinc-containing iron oxide or zinc oxide or iron oxide may be fed to the reduction furnace after granulation, the fly ash rate can decrease to thereby enhance the anti-scattering effect of the fly ash.

As described above, the present invention can reduce the treatment cost.

Hereinafter, a preferred embodiment of the reduction treatment apparatus and the method of reduction treatment according to the present invention will be described with reference to the drawings. FIG. 1 illustrates the facility provided with the reduction treatment apparatus according to an embodiment of the present invention. In this embodiment, the reduction treatment apparatus is the one for zinc-containing iron oxide.

As illustrated as an example in FIG. 1, the facility 100 has an electric furnace 1, a rotary kiln (reduction furnace) 2 which receives an electric furnace dust coming from the electric furnace 1 and a reducing material, to perform heat treatment thereof, a secondary combustion column 3 which is connected to an exit 2f of the rotary kiln 2 to complete the combustion, a boiler (heat recovery apparatus) 4 which receives a flue gas from the secondary combustion column 3 to conduct heat exchange, a gas cooling column 5 which cools a flue gas coming from the boiler 4, a cyclonic separator 6 which receives a flue gas from the gas cooling column 5 to conduct solid/gas separation, a preceding bag filter 7a which collects dust in the flue gas coming from the cyclonic separator 6, a flue gas treating agent feed apparatus 10 which supplies hydrated lime and activated carbon as the flue gas treating agents to the flue gas coming from the preceding bag filter 7a, and a succeeding bag filter 7b which is connected to the downstream side of the feed position of the flue gas treating agent to collect dust in the flue gas coming from the preceding bag filter 7a.

The facility 100 also has a magnetic separator 8 which separates iron from the discharge coming from the exit 2f of the rotary kiln 2, and a copper separator 9 which separates copper from the discharge after removing iron therefrom in the magnetic separator 8.

The electric furnace 1 manufactures steel by using iron scrap as the raw material for fusion at an intrafurnace temperature of, for example, 1500° C. to 1700° C. The electric furnace 1 generates electric furnace dust in the form of fly ash. A typical property of the electric furnace dust is given in Table 1.

TABLE 1

| T-Fe | M-Fe | FeO | $Fe_2O_3$ | Unit: %-dry Zn |
|---|---|---|---|---|
| 22.12 | 0.76 | 1.09 | 29.32 | 30.69 |

As seen in Table 1, the electric furnace dust contains about 22% of total iron (T-Fe), about 0.8% of metallic iron (M-Fe), about 30% of iron oxide, and about 30% of zinc, giving large amounts of zinc-containing iron oxide. As a result, the electric furnace dust with that property is sent to a non-ferrous smelter as a waste material.

The rotary kiln 2 has a cylindrically-shaped rotary shell 2a installed transversely, and is placed so as to incline downward from the front end (left side of the drawing) as inlet toward the rear end (right side of the drawing) as exit. Some types of the rotary kiln 2 are positioned horizontally. The rotary kiln 2 is sealed at the front end of the shell 2a by a front end support 2b as a fixing part, and is rotatably supported. The rotary kiln 2 is inserted at the rear end of the shell 2a into the secondary combustion column 3 as a fixing part while being rotatably supported.

At the front support 2b, a feed duct 2c (a feed duct is one example of oxide inlet) which feeds the electric furnace dust from the electric furnace 1 to the furnace of the rotary kiln 2 penetrates therethrough, and a fuel combustion unit 2d which combusts fuel such as heavy oil by using combustion air introduced into the furnace of the rotary kiln 2 penetrates therethrough. The fuel combustion unit 2d preheats the internal atmosphere of the furnace at the time of start-up of the furnace to a reduction temperature inside the furnace described later. When the temperature inside the furnace increases to the reduction temperature, and once the treatment begins (enters the rated operation), the operation of the fuel combustion unit 2d stops. The temperature inside the furnace is detected by a temperature sensor 12 (temperature information acquisition means) positioned near the exit 2f. The feed duct 2c has a reducing material feed unit 2e (a reducing material feed unit is one example of reducing material inlet). The reducing material feed unit 2e is to supply the reducing material to a specified position for blowing in the furnace without stopping the operation of the rotary kiln 2. Furthermore, at the front support 2b, a cooling water spray unit 13 which sprays cooling water into the furnace penetrates therethrough.

The rotary kiln 2 has a control means 15 which controls the operation of the cooling water spray unit 13 so as to maintain a constant temperature inside the furnace based on the temperature detected by the temperature sensor 12. The control means 15 controls the amount of spray by opening/closing of and adjusting the opening of a valve 14 on the cooling water line for feeding the cooling water to the cooling water spray unit 13, to thereby maintain a constant temperature inside the furnace.

The reducing material being fed from the reducing material feed unit 2e described above is ASR (automobile-originated shredder residue) in the embodiment, which ASR is requested to be treated in accordance with the Automobile Recycling Law. The ASR is not yet selected or selected. A typical property of the ASR is given in Table 2.

TABLE 2

| Water | Ash | Volatile matter | Fixed carbon |
|---|---|---|---|
| | | | Unit: % |
| 16.9 | 28.5 | 50.8 | 3.8 |

As shown in Table 2, ASR contains large amounts of volatile matter such as hydrogen and hydrocarbons, as high as about 50%, while containing small amount of fixed carbon counting about 4%. The ASR contains relatively large amounts of copper.

The rotary kiln 2 to which these electric furnace dust and ASR are supplied is operated under a rated condition at a $O_2$ concentration of 5%-dry or less in the flue gas at the exit 2f so as to keep a reducing atmosphere inside the furnace and at 800° C. to 1080° C. of the reduction temperature inside the furnace so as to prevent fusion of copper. Under the operation at that temperature, there progresses solid reduction (reduction in solid but not fused state) inside the rotary kiln 2.

With that type of rotary kiln 2, first, at the time of the start-up period of the furnace, the fuel combustion unit 2d is actuated to combust the fuel, high-temperature combustion gas and flame are generated, and thus the atmosphere inside the furnace is preheated to thereby increase the temperature inside the furnace within the range of 800° C. to 1080° C. Then, after the temperature inside the furnace rises within the range of 800° C. to 1080° C., the operation of the fuel combustion unit 2d stops, and the rated operation begins.

In the rated operation, the shell 2a rotates at a specified speed, and the electric furnace dust fed to the furnace via the feed duct 2c receives heat in the course of transfer thereof from the inlet to the exit 2f. Furthermore, the ASR being fed to the furnace via the reducing material feed unit 2e receives heat to generate heat necessary for reduction, and effectively functions as the reducing material and as the heating material. Thus the combustion treatment (heat treatment) is performed.

By the reducing action of ASR, zinc is reduced and is separated from the zinc-containing iron oxide in the electric furnace dust, and the iron oxide is reduced, thus the metallic iron being obtained. At that time, since the reduction temperature of the furnace is controlled to 1080° C. or less, the fusion of copper (1083° C. of melting point) to thereby adhere to iron is prevented. In addition, since the reduction temperature of the furnace is regulated to 800° C. or above, both the metallization rate (percentage of conversion of iron in the iron oxide into metallic iron) and the dezincification rate (percentage of removal of zinc) are enhanced (increased in performance).

Figure 2:
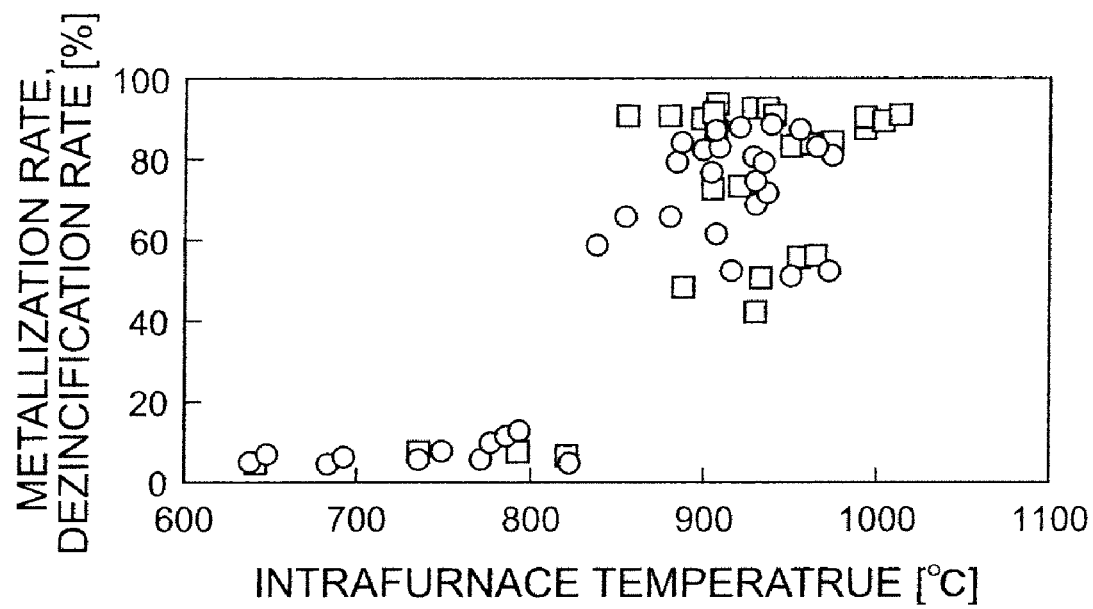
FIG. 2 is a graph showing the relation between the temperature inside the furnace and the metallization rate or the dezincification rate.

FIG. 2 is a graph showing the relation between the temperature inside the furnace and the metallization rate or the dezincification rate. The horizontal axis of the graph shows the temperature inside the rotary kiln 2, and the vertical axis thereof shows the metallization rate (%) and the dezincification rate (%), respectively. The circle signifies the metallization rate, and the square signifies the dezincification rate. As is obvious from FIG. 2, when the temperature inside the furnace is 800° C. or more, both the metallization rate and the dezincification rate increase as high as about 40% or more, which gives satisfactory reduction performance.

In the above rated operation, even if the properties of the heat source (heating material; reducing material) vary, the control means 15 controls the operation of the cooling water spray unit 13 to maintain a constant temperature inside the furnace, thus the desired reduction treatment is performed.

The discharge containing iron and copper flows down from the exit 2f and is discharged. On the other hand, the zinc separated from the zinc-containing iron oxide is vaporized to become fine dust to scatter, which fine dust is then carried by the flue gas to leave from the kiln exit 2f of the secondary combustion column 3 toward a secondary combustion chamber 3a positioned above the kiln exit 2f.

In this example, the blending ratio of the electric furnace dust (zinc-containing iron oxide) to the ASR can within the range of 1:1 to 1:10, or 1:4.

From the discharge which is discharged from the kiln exit 2f, iron is separated in the magnetic separator 8, and the separated iron is used as a raw material for the electric furnace 1. The iron is effectively used as the raw material not deteriorated in the quality because there is generated no copper fusion as described above. Also as described before, the electric furnace dust generated in the electric furnace 1 is fed to the rotary kiln 2, and the procedure is repeated.

Furthermore, from the discharge, which is discharged from the kiln exit 2f and from which iron is removed in the magnetic separator 8, copper is separated in the copper separator 9. The separated copper is effectively used as a raw material for copper smelting works.

On the other hand, in the secondary combustion chamber 3a, the unburnt matter in the flue gas is completely burnt, and the vaporized zinc becomes zinc oxide and the like, to thereby proceed to the succeeding stage as a zinc-concentrated high zinc-concentration dust.

The dust passes through the boiler 4 together with the flue gas, and the heat recovery is performed in the boiler 4 for effectively using the heat as a heat source. The flue gas passing through the boiler 4 is cooled in the gas cooling column 5 to a specified temperature, and then is sent to the cyclonic separator 6. The cyclonic separator 6 conducts solid/gas separation to separate and collect dust (solid matter) having a specified weight from the flue gas. The dust collected by the cyclonic separator 6 is a high zinc-concentration dust.

The flue gas passing through the cyclonic separator 6 passes through the preceding bag filter 7a, where the dust which was not collected by the cyclonic separator 6 is collected. Also the dust collected by the preceding bag filter 7a is the above-described high zinc-concentration dust.

To the flue gas passing through the preceding bag filter 7a, hydrated lime and activated carbon are supplied from the flue gas treating agent feed apparatus 10. As a result, harmful substances such as chlorine and sulfur in the flue gas combine with the hydrated lime, and the harmful substances such as dioxins in the flue gas are adsorbed by the activated carbon. The flue gas containing the hydrated lime which combines with these harmful substances and the activated carbon which adsorbs the harmful substances such as dioxins passes through the succeeding bag filter 7b, where the dust containing the hydrated lime and the activated carbon is collected. The dust collected by the succeeding bag filter 7b is subjected to landfill treatment and the like. The gas having passed through the succeeding bag filter 7b and having completed dechlorination, desulfurization, and dedioxination to be purified is vented to atmosphere via a chimney 11 in the succeeding stage.

On the other hand, since the high zinc-concentration dust collected and recovered by the cyclonic separator 6 and by the preceding bag filter 7a contains zinc at concentrations of 50 to 80%, the dust is extremely effectively used as a raw material of crude zinc ore for zinc smelting works. In connection to this, the electric furnace dust coming from the electric furnace 1 contains zinc at a concentration of about 30%.

Furthermore, in this embodiment, the cyclonic separator 6 and the two stage bag filters 7a and 7b are arranged after the rotary kiln 2, the cyclonic separator 6 and the preceding bag filter 7a collect and recover the high zinc-concentration dust free from chlorine, sulfur, and flue gas treating agent, and thus the collected high zinc-concentration dust is sent to zinc smelting works. However, the cyclonic separator 6 and the first stage bag filter 7a may be arranged after the rotary kiln 2, and the flue gas treating agent may be fed in the flue gas line between the cyclonic separator 6 and the bag filter 7a. Thus, only cyclonic separator 6 may collect and recover the high zinc-concentration dust free of chlorine, sulfur, and flue gas treating agent, to send the dust to zinc smelting works. Further, only two stage bag filters 7a and 7b may be arranged after the rotary kiln 2, and the flue gas treating agent may be fed to the flue gas line between the bag filters 7a and 7b. Thus, only preceding bag filter 7a may collect and recover the high zinc-concentration dust free of chlorine, sulfur, and flue gas treating agent, to send the dust to zinc smelting works. In other words, the dust which is collected at upstream side of the most downstream bag filter can be supplied as a raw material for zinc smelting works, thus effective use of zinc is available.

According to the embodiment, as described above, to the rotary kiln 2 to which zinc-containing iron oxide is fed, there is supplied ASR which is the waste effective as a reducing material and functions as a heating material generating heat necessary for reduction, and the reduction treatment is performed with the use of the material as the heat source and without applying the fuel combustion unit 2d, or without using auxiliary fuel. As a result, zinc can be separated from zinc-containing iron oxide by the reduction thereof and the metallic iron can be obtained by the reduction of oxide while the reduction of the treatment cost (reduction of the running cost by the amount of not-using auxiliary fuel) being performed.

Table 3 shows the experimental result given by the inventors of the present invention by using the facility illustrated in FIG. 1, through the use of an electric furnace dust having the property given in Table 1 and an ASR having the property given in Table 2. Table 3 shows the property of a discharge from the rotary kiln 2.

TABLE 3

| T-Fe | M-Fe | FeO | $Fe_2O_3$ | Unit: %-dry Zn |
|------|------|-----|-----------|----------------|
| 65.1 | 59.5 | 7.2 | <0.01 | 2.6 |

As shown in Table 3, the discharge contains total iron (T-Fe) of about 65%, metallic iron (M-Fe) of about 60%, iron oxide of about 7%, and zinc of about 2%, which confirms that the content of metallic iron is significantly increased and that the zinc content is significantly decreased.

Alternatively, the rotary kiln 2 after the treatment of the zinc-containing iron oxide may be used as an oxidation fusion furnace at temperatures of, for example, approximately 1200° C. to 1300° C. to thereby fuse the residue of the discharge after the removal of iron and copper. In that case, the slug from the rotary kiln 2 as the oxidation fusion furnace can be effectively used as, for example, road base course material and concrete aggregate.

The residue of the discharge after the removal of iron and copper contains large amounts of carbon, silica, alumina, calcia, and the like. Accordingly, the residue of the discharge after the removal of iron and copper may be fed to the electric furnace 1. By performing the operation, carbon functions as a coke-substitute (recarburizing material), and silica, alumina, calcia, and the like are fused. Thus, the slug from the electric furnace 1 is effectively used as, for example, road base course material and concrete aggregate.

Furthermore, the discharge from the rotary kiln 2 may be sieved, and iron and copper may be separated, respectively, by the magnetic separator 8 and the copper separator 9, only from sieve discharge. Then, the iron may be used as a raw material for the electric furnace 1, and the copper may be used as a raw material for copper smelting works. By performing the operation, the separated iron and copper, respectively, are effectively used, and the handling performance of iron and copper is improved.

In addition, the rotary kiln 2 after the treatment of the zinc-containing iron oxide may be used as an oxidation fusion furnace at approximate temperatures of, for example, 1200° C. to 1300° C., and the sieve discharge after the removal of iron and copper may be fused. By performing the operation, the slug from the rotary kiln 2 as the oxidation fusion furnace can be effectively used as, for example, road base course material and concrete aggregate, and the handling performance of the discharge being fed to the rotary kiln 2 as the oxidation fusion furnace improves.

Furthermore, the sieve discharge after the removal of iron and copper may be fed to the electric furnace 1. By performing the operation, carbon functions as a coke-substitute (recarburizing material), and silica, alumina, calcia, and the like are fused. Thus, the slug coming from the electric furnace 1 is effectively used as, for example, base course material for road and aggregate for concrete, and further the handling performance of the discharge being fed to the electric furnace 1 improves.

Figure 3:
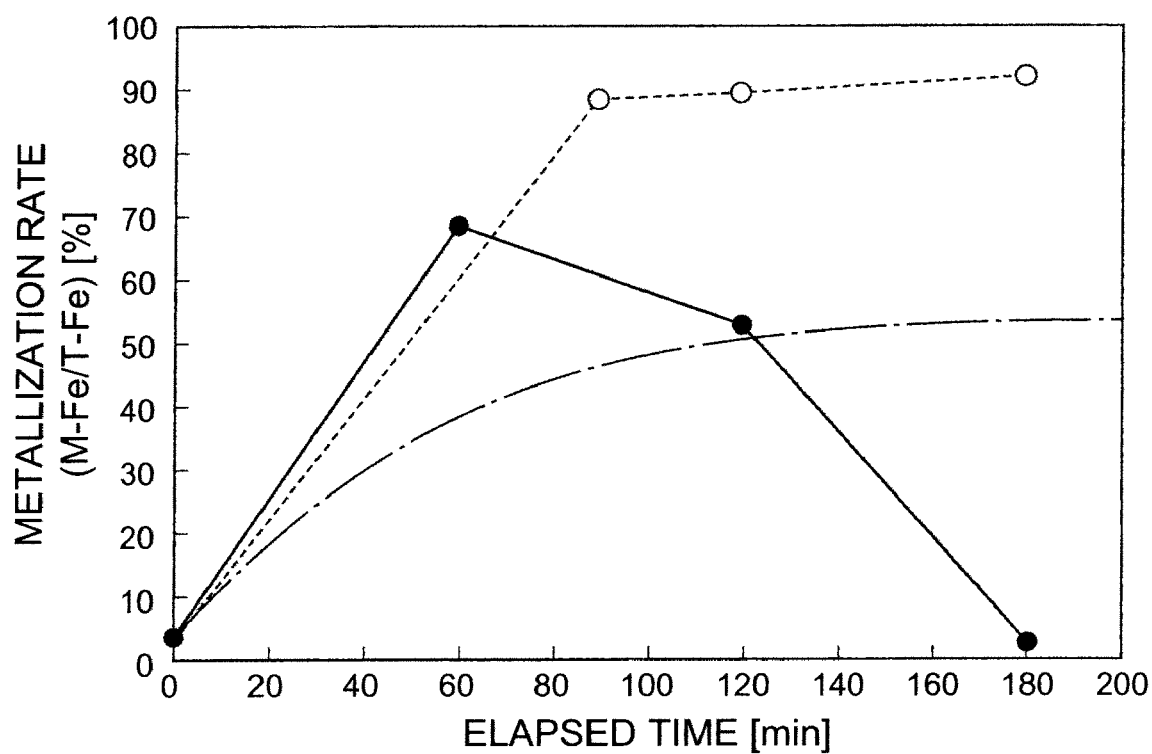
FIG. 3 is a diagram illustrating the changes in the reducing function of ASR as the reducing material with time, together with the case of additional supply of ASR, in comparison with the case of coke.

Meanwhile, since ASR contains small amounts of fixed carbon and large amounts of volatile matter as described before, the ASR has characteristics of reducing material, different from those of coke which is a lump of fixed carbon. FIG. 3 is a diagram illustrating the changes in the reducing function of ASR as the reducing material with time, together with the case of additional supply of ASR, and in comparison with the case of coke.

In FIG. 3, the horizontal axis shows the time, and the vertical axis shows the metallization rate (M-Fe/T-Fe). The solid line in the graph signifies the changes in the metallization rate with the passage of time, under the reduction temperature of 950° C. and at the blending ratio of the electric furnace dust to the ASR of 1:4. The broken line in the graph signifies the changes in the metallization rate with the passage of time, under the reduction temperature of 950° C. and at the blending ratio of the electric furnace dust to the ASR of 1:4, and by additional supply of ASR in the middle, at the blending ratio of the electric furnace dust to the ASR of 1:10. The dashed line in the graph signifies the case of coke.

As shown by the solid line in FIG. 3, although the ASR promptly begins to exert the reducing function owing to small amounts of fixed carbon and large amounts of volatile matter, the reducing function persists only for 1 to 3 hours. Consequently, the retention time of the zinc-containing iron oxide in the rotary kiln 2 may be controlled to be 1 to 3 hours.

Figure 4:
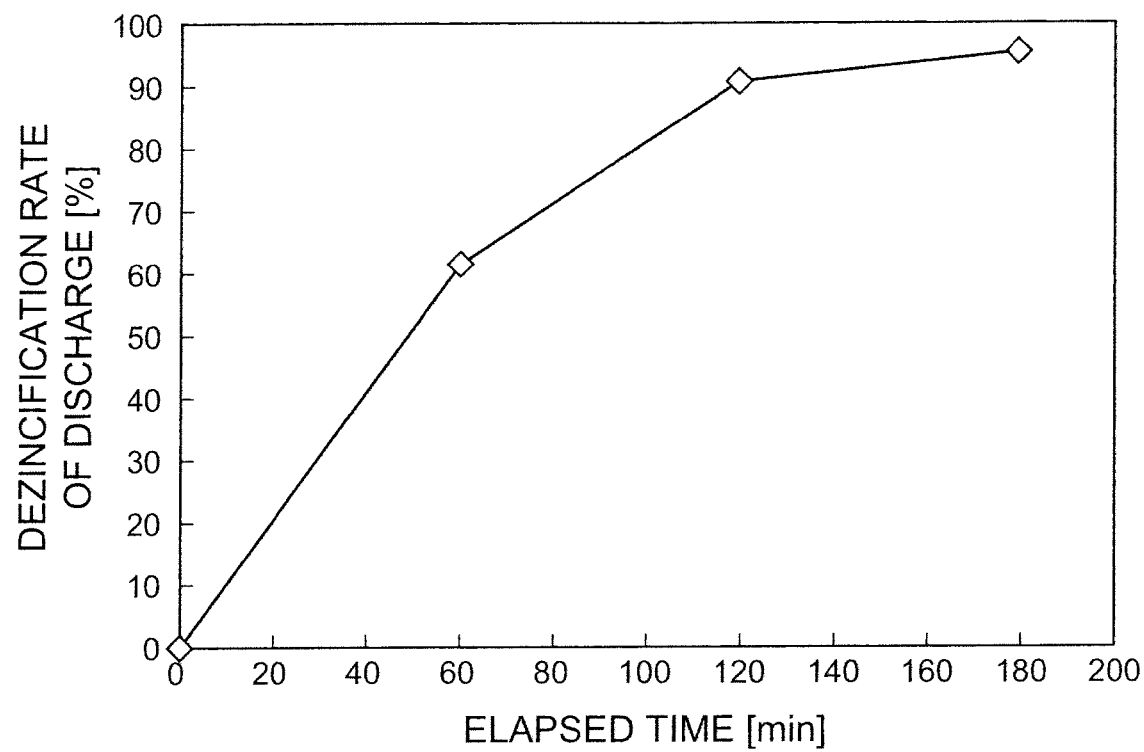
FIG. 4 is a diagram illustrating the changes in the dezincification rate of a discharge over time.

FIG. 4 is a diagram illustrating the changes in the dezincification rate of a discharge with the passage of time. In FIG. 4, the horizontal axis shows the time, and the vertical axis shows the dezincification rate of a discharge. The solid line in the diagram signifies the changes in the dezincification rate of a discharge with the passage of time, under the reduction temperature of 950° C. and at the blending ratio of the electric furnace dust to the ASR of 1:4. As shown in FIG. 4, also in view of the dezincification rate, the retention time of the zinc-containing iron oxide in the rotary kiln 2 is preferably controlled to be 1 to 3 hours.

As described above, ASR has a short functioning period as the reducing material, the additional supply of ASR to the rotary kiln 2 can maintain the function as the reducing material with the passage of time. It is confirmed that the additional supply of ASR significantly extends the period of reducing function, as shown by the broken line in FIG. 3. In the case of the additional supply of ASR, the ASR can be blown into a position where the ASR function is lost in the rotary kiln 2 through the use of the reducing material feed unit 2e.

Furthermore, when coke is fed to the rotary kiln 2 in advance, in comparison with the case of ASR in FIG. 3, the coke as the lump of fixed carbon has characteristics of sustaining reducing function for an extended period of time, though the exertion of reducing function begins late. Therefore, even after ASR stops functioning with the passage of time, the coke functions as the reducing material for an extended period of time.

The present invention is described above in detail based on an embodiment. The present invention, however, is not limited to the above embodiment. For example, although the above embodiment adopts the electric furnace dust containing large amounts of zinc-containing iron oxide as a material to be treated, and increases the recovery rate of iron and zinc, thus effectively using the recovered iron and zinc efficiently, the material to be treated may be, for example, sludge generated from a wastewater treatment facility as a peripheral facility of the electric furnace or rolling scale generated from a rolling facility. The material to be treated is arbitrary if only it contains zinc-containing iron oxide. The embodiment selects the zinc-containing iron oxide as a specifically preferred target for reduction. Instead of the zinc-containing iron oxide, however, zinc oxide or iron oxide can also be applicable as the reduction target. In the case of zinc oxide, in the same way as the above case of zinc-containing iron oxide, the zinc is reduced and is possible to be recovered as a dust of high zinc-concentration. In the case of iron oxide, in the same way as the above case of zinc-containing iron oxide, the iron oxide is reduced and is possible to be recovered as a metallic iron not deteriorated in the quality.

Moreover, according to the above embodiment, the ASR which contains large amounts of copper and which is requested to be treated in accordance with the Automobile Recycle Law is used as the reducing material and the heating material, and thus the Automobile Recycle Law is satisfied. In addition, the action and effect of the above embodiment specifically to prevent fusion and adhesion of copper to the metallic iron is further enhanced. However, there may also be used at least one of ASR, shredder dust of home electric appliances, waste plastics, refuse-derived RDF, RPF, sludge, oil mud, chips of wood, thread debris, rubber debris, and animal and plant residues, as the waste which is effective as the reducing material and functions as a heating material of generating heat necessary for reduction. Further they may not be in the form of molded article and homogenized product such as RPF. The ASR may be in a state of being discharged from shredder dust trader. And even if the ASR is in a state of being discharged from shredder dust trader, the rotary kiln 2 as the reduction furnace can easily accept the ASR.

The embodiment adopts the rotary kiln 2 as the furnace which readily accepts even the ASR in the state of being discharged from shredder dust trader and which can create a suitable reducing atmosphere therein. However, a shaft furnace, a high temperature gasification furnace, and the like can be used if only the furnace functions as the reduction furnace.

When a Ca-containing material such as quicklime, hydrated lime, or limestone is supplied to the reduction furnace, the basicity in the reduction furnace increases, which can prevent the generation of clinker in the reduction furnace.

Furthermore, when the zinc-containing iron oxide or zinc oxide or iron oxide being fed to the reduction furnace is granulated and then introduced into the reduction furnace, the fly ash rate can be reduced, and the anti-scattering effect can be increased.

The above embodiment applies the temperature sensor 12 to detect directly the temperature inside the furnace. Any method can be applied if only the temperature information is acquired.

What is claimed is:

1. A method of reduction treatment for obtaining metallic iron, by reducing zinc and/or iron oxide through heat treatment of zinc-containing iron oxide or zinc oxide or iron oxide, with a reducing material in a reduction furnace, the method comprising:
   supplying at least one of automobile-originated shredder residue, shredder dust of home electric appliances, waste plastics, refuse derived fuel, refuse paper and plastic fuel, sludge, oil mud, chips of wood, thread debris, rubber debris, and animal and plant residues to the reduction furnace as the reducing material and as a heating material;
   performing the reduction treatment with the use of the reducing material as the heat source and without using auxiliary fuel; and
   controlling, using a controller, a cooling unit to maintain a constant temperature in the reduction furnace,
   wherein the zinc-containing iron oxide or the zinc oxide or the iron oxide is introduced into the reduction furnace after a granulation.

2. A reduction treatment apparatus, comprising:
a reduction furnace configured to reduce zinc and/or iron oxide through heat treatment of zinc-containing iron oxide or zinc oxide or iron oxide, with a reducing material;
an oxide inlet configured to supply to the reduction furnace the zinc-containing iron oxide or zinc oxide or iron oxide;
a reducing material inlet configured to supply to the reduction furnace the reducing material; and
a controller configured to control a cooling unit to maintain a constant temperature inside the reduction furnace,
wherein the reducing material comprises at least one of automobile-originated shredder residue, shredder dust of home electric appliances, waste plastics, refuse derived fuel, refuse paper and plastic fuel, sludge, oil mud, chips of wood, thread debris, rubber debris, and animal and plant residues,
wherein the reduction furnace is configured to use the reducing material as a heating material and reduce the zinc-containing iron oxide or zinc-oxide or iron oxide without auxiliary fuel, and
wherein the zinc-containing iron oxide or the zinc oxide or the iron oxide is introduced into the reduction furnace after a granulation.

3. The reduction treatment apparatus according to claim 2, wherein the reduction furnace is a rotary kiln.

4. The reduction treatment apparatus according to claim 2, wherein a material containing Ca is supplied to the reduction furnace.

5. A reduction treatment apparatus, comprising:
reducing means for reducing zinc and/or iron oxide through heat treatment of zinc-containing iron oxide or zinc oxide or iron oxide, with a reducing material;
oxide supplying means for supplying to the reducing means the zinc-containing iron, oxide or zinc oxide or iron oxide;
reducing material supplying means for supplying to the reducing means the reducing material; and
controlling means for controlling a cooling unit to maintain a constant temperature inside the reduction furnace,
wherein the reducing material comprises at least one of automobile-originated shredder residue, shredder dust of home electric appliances, waste plastics, refuse derived fuel, refuse paper and plastic fuel, sludge, oil mud, chips of wood, thread debris, rubber debris, and animal and plant residues,
wherein the reducing means is configured to use the reducing material as a heating material and reduce the zinc-containing iron oxide or zinc-oxide or iron oxide without auxiliary fuel, and
wherein the zinc-containing iron oxide or the zinc oxide or the iron oxide is introduced into the reducing means after a granulation.

* * * * *